(12) United States Patent
Kudo

(10) Patent No.: US 6,343,238 B1
(45) Date of Patent: Jan. 29, 2002

(54) SYSTEM FOR PROVIDING INFORMATION REGARDING PRODUCTION PROGRESS

(75) Inventor: Isao Kudo, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/192,596

(22) Filed: Nov. 17, 1998

(30) Foreign Application Priority Data

Apr. 9, 1998 (JP) .......................................... 10-097126

(51) Int. Cl.⁷ .............................................. G06F 19/00
(52) U.S. Cl. ........................ 700/108; 700/99; 700/106; 700/111
(58) Field of Search ....................... 700/95–97, 99–107, 700/108–111; 705/7–9

(56) References Cited

U.S. PATENT DOCUMENTS 5,768,133 A * 6/1998 Chen et al. .................... 700/95
5,914,878 A * 6/1999 Yamamoto et al. ......... 700/106
5,946,663 A * 8/1999 Tanaka et al. ................. 705/8
6,094,603 A * 7/2000 Ishii ............................. 700/97

FOREIGN PATENT DOCUMENTS

| JP | 4-346106 | 12/1992 |
| JP | 5-12300 | 1/1993 |
| JP | 5-111855 | 5/1993 |
| JP | 5-257945 | 10/1993 |
| JP | 10-170602 | 6/1998 |

* cited by examiner

Primary Examiner—Paul P. Gordon
Assistant Examiner—Steven R. Garland
(74) Attorney, Agent, or Firm—Jones Volentine, PLLC

(57) ABSTRACT

A computerized system for providing various sorts of information regarding the current progress in a mass production process, for the ultimate purpose to allow a manager in charge of the mass production process to use the information to decide various parameters influential for the following processes, the computerized system having a various function to analyze the current position in the mass production process.

20 Claims, 16 Drawing Sheets

SYSTEM FOR PROVIDING INFORMATION REGARDING PRODUCTION PROGRESS

FIELD OF THE INVENTION

This invention relates to a computerized system for providing various kinds of information regarding the current progress in a mass production process. The information is useful for a manager in charge of management of a mass production line, when he is required to make some decision on various parameters for the purpose to maximize the efficiency of the mass production line. The information is obtained employing a computer system.

BACKGROUND OF THE INVENTION

The object of management of a mass production line is to maximize the efficiency of the mass production line. "A turn-around-time" defined as a length of time required for completion of production of a lot of products, is one of the most important parameters to determine a magnitude of efficiency of a mass production line. In this specification, "a mass production line" is assumed to be a production line which is employable for producing various kinds of products, and "a lot" is defined as a unit for identifying a group of a single kind of product to be produced employing a mass production line. As a result, "a turn-around-time" means in this specification a length of time required to produce a group of a single kind of product employing a mass production line, and the length of time is identified as a length of time from the beginning of supply of the first item of the materials to be processed for production of a lot until the termination of delivery of the last item of the finished products included in the same lot.

Although a turn-around-time, a received quality of materials and a shipped quantity of finished products were major tools employable for management of a mass production line and which is available in the prior art and which is employable for management of a mass production line, other parameters including a factor showing operation of facilities, a factor showing working time of laborers, et al. are items to be influential for the efficiency of a mass production line. This is because the parameters influential for a turn-around-time are increasingly more complicated, in line with a tendency in which a production process is increasingly more complicated.

Accordingly, if a system for providing various kinds of information regarding the current progress in a mass production line, it is remarkably helpful for a manager in charge of the management of a mass production line to improve the efficiency of the mass production line and to minimize the turn-around-time thereof.

OBJECTS AND SUMMARY OF THE INVENTION

Accordingly, the sole object of this invention is to provide a system for providing various kinds of information regarding the current progress in a mass production line which is effective to assist a manager in charge of the management of a mass production line to improve the efficiency of the mass production line, when he makes some decision on various parameters regarding the following progress of the mass production line.

Each system for providing information regarding production progress of a mass production line in accordance with this invention is composed of a computerized means having a specific function which is specified for each embodiment, the computerized means being a host computer attached by a memory means, plural input means for inputting various source information and plural output means for outputting results of the computerized means. Some of the results of the computerized means are preferably shown in terms of a histogram which is conveniently displayed on a screen of display means.

In this sense, identification of each embodiment in accordance with this invention is made by the function of a computerized means included in each of the systems. Accordingly, the following description will be concentrated in the function of each embodiment.

To achieve the foregoing sole object, a system for providing information regarding production progress of a mass production line in accordance with a first embodiment of this invention comprises a plurality of first input means for respectively inputting a quantity of materials received by, a quantity of materials remained unprocessed at and a quantity of finished products shipped from a production stage of a mass production line for production of a production lot, a first computerized means for calculating relations respectively between the quantity of finished products and a sum of the received quantity of materials and the quantity of materials remained unprocessed for a production stage of a mass production line of a production lot and a plurality of first output means for outputting the relations respectively between the quantity of finished products and the sum of the received quantity of materials and the quantity of materials remained unprocessed for the production stage of a mass production line for production of the production lot.

In the foregoing first embodiment, the relations respectively between the quantity of finished products and the sum of the received quantity of materials and the quantity of materials remained unprocessed for the production stage of a mass production line for production of the production lot, can be shown in a graph and the first output means can be display means.

To achieve the foregoing sole object, a system for providing information regarding production progress of a mass production line in accordance with a second embodiment of this invention comprises a plurality of first input means for respectively inputting a quantity of materials received by, a quantity of materials remained unprocessed at and a quantity of fished products shipped from a production stage of a mass production line for production of a production lot, a plurality of second input means for respectively inputting an operation period of each of facilities provided for a production stage for a production lot, a time at which each of the facilities starts operation at each of the production stage for each production lot and a time at which each of the facilities finishes operation at each of the production stage, a second computerized means for calculating relations respectively between the quantity of finished products and a sum of the received quantity of materials and the quantity of materials remained unprocessed, relations between a length of period during which some of the facilities are remained under an idle position or a non-operating position and a sum of the received quantity of materials and the quantity of materials remained unprocessed, and relations between an average turn-around-time and a sum of the received quantity of materials and the quantity of materials remained unprocessed, for a production stage of a mass production line for production of a production lot, and a plurality of second output means for outputting the relations respectively between the quantity of finished products and the sum of the received quantity of materials and the quantity of materials remained unprocessed, and the relations between a length of period during which each of the facilities is remained under an idle position or a non-operating position and a sum of the received quantity of materials and the quantity of materials remained unprocessed, and relations between an average turn-around-time and a sum of the received quantity of materials and the quantity of materials remained unprocessed, for a production stage of a mass production line for production of a production lot.

In the foregoing second embodiment, relations respectively between the quantity of finished products and the sum of the received quantity of materials and the quantity of materials remained unprocessed, and the relations between a length of period during which each of the facilities is remained under an idle position or a non-operating position and a sum of the received quantity of materials and the quantity of materials remained unprocessed, and relations between an average turn-around-time and a sum of the received quantity of materials and the quantity of materials remained unprocessed, for a production stage of a mass production line for production of a production lot, can be shown in graphs and the second output means can be display means.

To achieve the foregoing sole object, a system for providing information regarding production progress of a mass production line in accordance with a third embodiment of this invention comprises a third computerized means for calculating a length of period during which each of the facilities is busy or in an operating position, a length of period during which no work is conducted, and a length of period during which materials or finished products are being carried from a location to another location for each of production stage of a mass production line for production of a production lot, and a third output means for outputting the length of period during which each of the facilities is busy or in an operating position, a length of period during which no work is conducted, and a length of period during which materials or finished products are being carried from a location to another location for each of production stage of a mass production line for production of a production lot, in addition to all the ingredients of the system for providing information regarding production progress of a mass production line is accordance with the second embodiment of this invention.

In the foregoing third embodiment, the length of period during which each of the facilities is busy or in an operating position, the length of period during which no work is conducted, and the length of period during which materials or finished products are being carried from a location to another location for each of production stage of a mass production line for production of a production lot, can be shown in a graph and the third output means can be display means.

To achieve the foregoing sole object, a system for providing information regarding production progress of a mass production line in accordance with a first phase of a fourth embodiment of this invention comprises a fourth computerized means having a function, in combination, for finding whether or not some materials are remained unprocessed, whenever any of the facilities suspends operation, and for determining the reason why some of the facilities are remained under an idle position or a non-operating position is a lack of laborers, if some materials are remained unprocessed and for determining the reason why some of the facilities are remained under an idle position or non-operating position is a lack of materials, if no materials are remained unprocessed, and a plurality of fourth output means for outputting results of the fourth computerized means, in addition to all the ingredients of the system for providing information regarding production progress of a mass production line of the second embodiment of this invention.

In the foregoing first phase of the fourth embodiment, the resultant information can be shown in a graph and the fourth output means can be display means.

To achieve the foregoing sole object, a system for providing information regarding production progress of a mass production line in accordance with a second phase of a fourth embodiment of this invention comprises a fourth computerized means having a function, in combination, for finding whether or not some quantity of materials are remained unprocessed, whenever any of the facilities suspends operation, and for determining the reason why some quantity of the facilities are remained under an idle position or a non-operating position is a lack of laborers, if some quantity of materials are remained unprocessed and for determining the reason why some of the facilities are remained under an idle position or non-operating position is a lack of materials, if no materials are remained unprocessed, a plurality of fourth output means for outputting results of the fourth computerized means, in addition to all the ingredients of the system for providing information regarding production progress of a mass production line of the third embodiment of this invention.

In the foregoing second phase of the fourth embodiment, the resultant information can be shown in a graph and the fourth output means can be display means.

To achieve the foregoing sole object, a system for providing information regarding production progress of a mass production line in accordance with a first phase of a fifth embodiment of this invention comprises a fifth computerized means for finding whether or not a sum of the received quantity of materials and the quantity of materials remained unprocessed is in excess of a maximum allowable quantity of materials remained unprocessed for a production stage of a mass production line for production of a production lot and a means for informing results of the fifth computerized means, in an occasion that the sum of the received quantity of materials and the quantity of materials remained unprocessed is found to be in excess of the maximum allowable quantity of materials remained unprocessed for an arbitrary production stage of a mass production line for production of a production lot, in addition to all the ingredients of the system for providing information regarding production progress of a mass production line of the first embodiment of this invention.

In the foregoing first phase of the fifth embodiment, the resultant information can be shown in a graph and the means for informing the results can be display means.

To achieve the foregoing sole object, a system for providing information regarding production progress of a mass production line in accordance with a second phase of a fifth embodiment of this invention comprises a fifth computerized means for finding whether or not a sum of the received quantity of materials and the quantity of materials remained unprocessed is in excess of a maximum allowable quantity of materials remained unprocessed for a production stage of a mass production line for production of a production lot and a means for informing results of the fifth computerized means, in an occasion that the sum of the received quantity of materials and the quantity of materials remained unprocessed is found to be in excess of a maximum allowable quantity of materials remained unprocessed for an arbitrary production stage of a mass production line for production of a production lot, in addition to all the ingredients of the system for providing information regarding production progress of a mass production line of the second embodiment of this invention.

In the foregoing second phase of the fifth embodiment, the resultant information can be shown in a graph and the means for informing the results can be display means.

To achieve the foregoing sole object, a system for providing information regarding production progress of a mass production line in accordance with a third phase of a fifth embodiment of this invention comprises a fifth computerized means for finding whether or not a sum of the received quantity of materials and the quantity of materials remained unprocessed is in excess of a maximum allowable quantity of materials remained unprocessed for a production stage of a mass production line for production of a production lot and a means for informing results of the fifth computerized means, m an occasion that the sum of the received quantity of materials and the quantity of materials remained unprocessed is found to be in excess of a maximum allowable quantity of materials remained unprocessed for an arbitrary system for providing information regarding production progress of a mass production line, in addition to all the ingredients of the third embodiment of this invention.

In the foregoing third phase of the fifth embodiment, the resultant information can be shown in a graph and the means for informing the results can be display means.

To achieve the foregoing sole object, a system for providing information regarding production progress of a mass production line in accordance with a fourth phase of a fifth embodiment of this invention comprises a fifth computerized means for finding whether or not a sum of the received quantity of materials and the quantity of materials remained unprocessed is in excess of a maximum allowable quantity of materials remained unprocessed for a production stage of a mass production line for production of a production lot and a means for informing results of the fifth computerized means, in an occasion that the sum of the received quantity of materials and the quantity of materials remained unprocessed is found to be in excess of a maximum allowable quantity of materials remained unprocessed for an arbitrary system for providing information regarding production progress of a mass production line, in addition to all the ingredients of the fourth embodiment of this invention.

In the foregoing fourth phase of the fifth embodiment, the resultant information can be shown in a graph and the means for informing the results can be display means.

BRIEF DESCRIPTION OF THE DRAWINGS

This invention, together with its various features and advantages, can be readily understood from the following more detailed description presented in conjunction with the following drawings, in which.

DETAILED DESCRIPTION OF THE PREFERRED EMBODIMENTS

Figure 1:
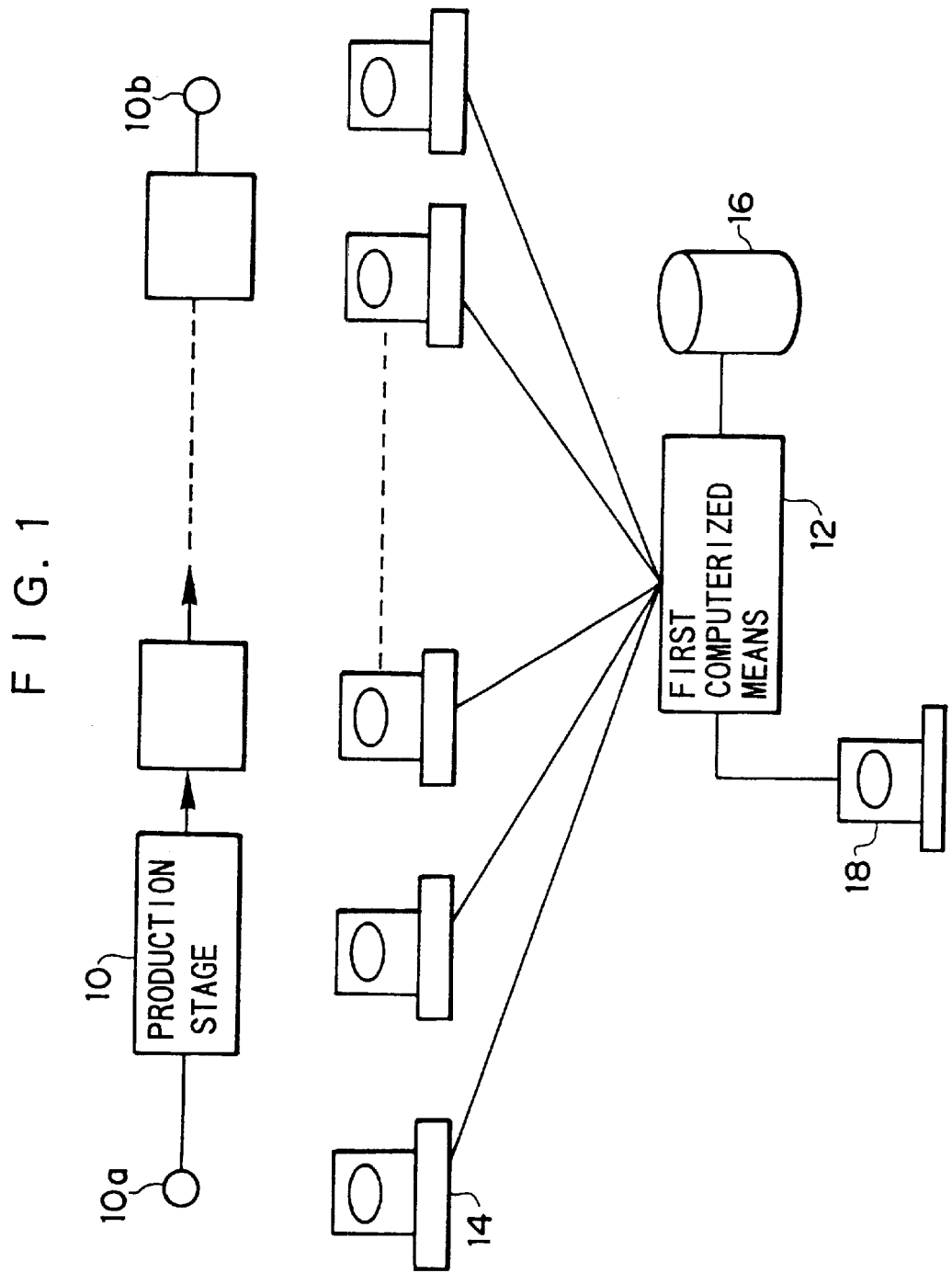
FIG. 1 is a schematic drawing illustrating general construction of a system for providing information regarding production progress of a mass production line in accordance with the first embodiment of this invention.

Referring to drawings, five independent embodiments of systems for providing information regarding production progress of a mass production line in accordance with this invention will be described below. As was described earlier, and as is illustrated in FIG. 1, each system for providing information regarding production progress of a mass production line in accordance with this invention is composed of a computerized means having a specific function which is specified for each embodiment, the computerized means being a host computer accompanied by a memory means, plural input means for inputting various source information, each of the plural input means being provided to each production stage and the beginning of the mass production line and the termination thereof and output means for outputting results of the computerized means.

Some of the results are preferably shown in terms of a histogram which is conveniently displayed on a screen of a display means.

In this sense, identification of each embodiment in accordance with this invention is made by the function of a computerized means included in each of the systems.

First Embodiment

A system for providing information regarding production progress of a mass production line having a function to provide relations respectively between the quantity of finished products and a sum of the received quantity of materials and the quantity of materials remained unprocessed for a production stage of a mass production line for production of a production lot.

Referring to FIG. 1 again, a system for providing information regarding production progress of a mass production line in accordance with the first embodiment of this invention is composed of a first computerized means 12 or a host computer 12 which calculates and provides relations respectively between the quantity of finished products and a sum of the received quantity of materials and the quantity of materials remained unprocessed for a production stage for a mass production line of a production lot, plural first inputs means 14 for respectively inputting a quantity of materials received by a production stage of a mass production line for production of a production lot, a quantity of materials remained unprocessed at a production stage of a mass production line for production of a production lot, and a quantity of finished products shipped from a production stage of a mass production line for production of a production lot, each of the plural first input means 14 being provided to each production stage 10 and the beginning $10_a$ of the mass production line and the termination thereof $10_b$, a memory means 16, and a first output means 18 for outputting results of the first computerized means 12. The first output means 18 can be display means.

Figure 2:
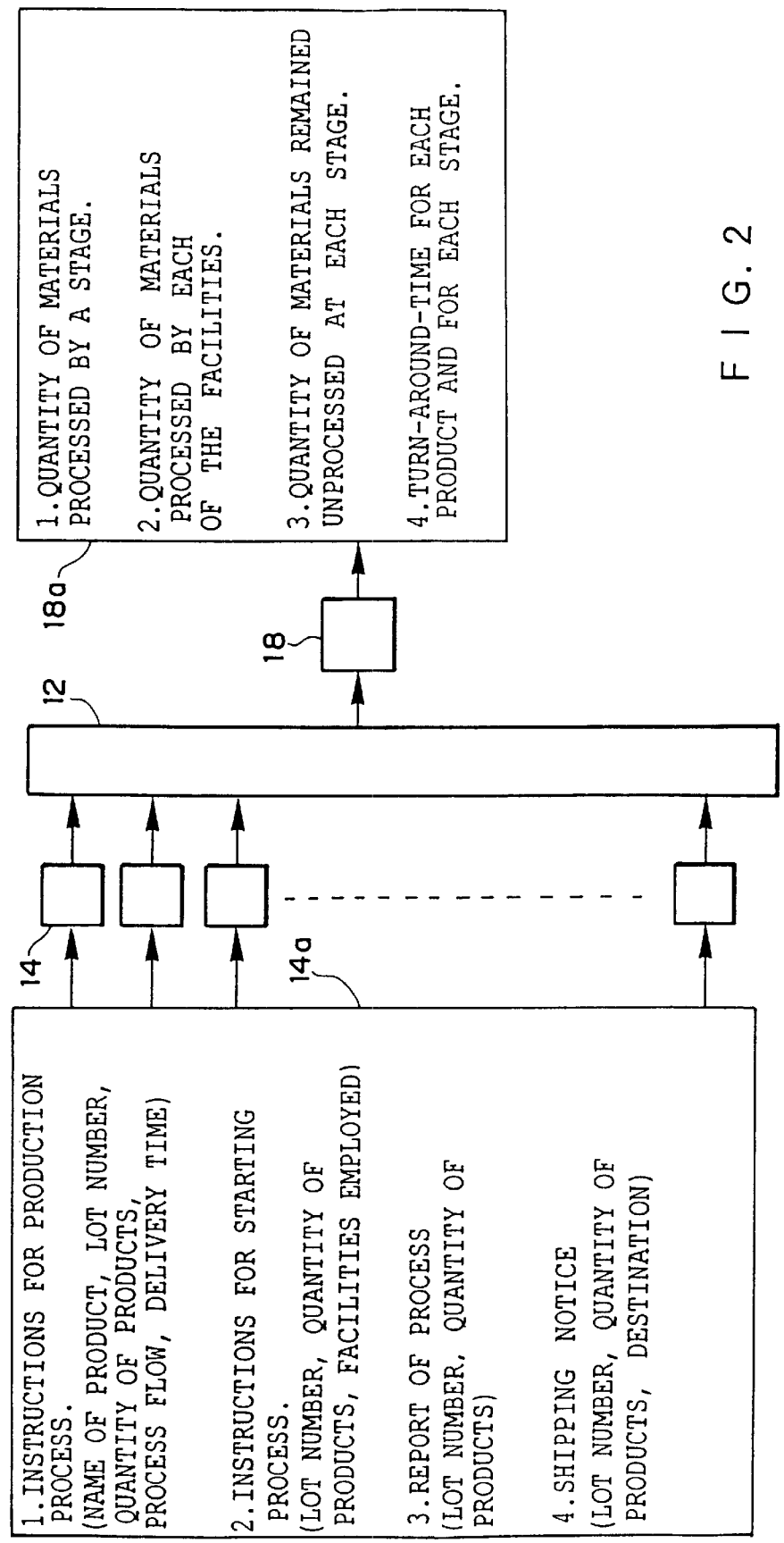
FIG. 2 is a schematic drawing itemizing information received by and outputted from the system for providing information regarding production progress of a mass production line in accordance with the first embodiment of this invention.

Referring to FIG. 2, the source information inputted by each of the input means 14 is itemized below, as is shown by a label $14_a$ in FIG. 2.

1. Instructions for production process.
    a. Name of product.
    b. Lot number.
    c. Quantity of products.
    d. Process flow.
    e. Delivery time.
2. Instructions for starting process.
    a. Lot number.
    b. Quantity of products.
    c. Facilities to be employed.
3. Report of processing.
    a. Lot number.
    b. Quantity of products.
4. Shipping notice.
    a. Lot number.
    b. Quantity of products.
    c. Destination.

The foregoing items of information are inputted by a laborer for each lot and for each production stage.

Referring to FIG. 2 again, the resultant information outputted from the output means 18 is itemized below, as is shown by a label $18_a$ in FIG. 2.

1. Quantity of materials processed by a production stage.
2. Quantity of materials processed by each of the facilities.
3. Quantity of materials remained unprocessed at each production stage.
4. Turn-around-time for each product and for each production stage.

Timewise information is automatically picked up from a clock which is built-in in the first computerized means 12.

It is needless to refer to necessity of a computer program based on the algorithm effective to realize the foregoing calculation.

Figure 3:
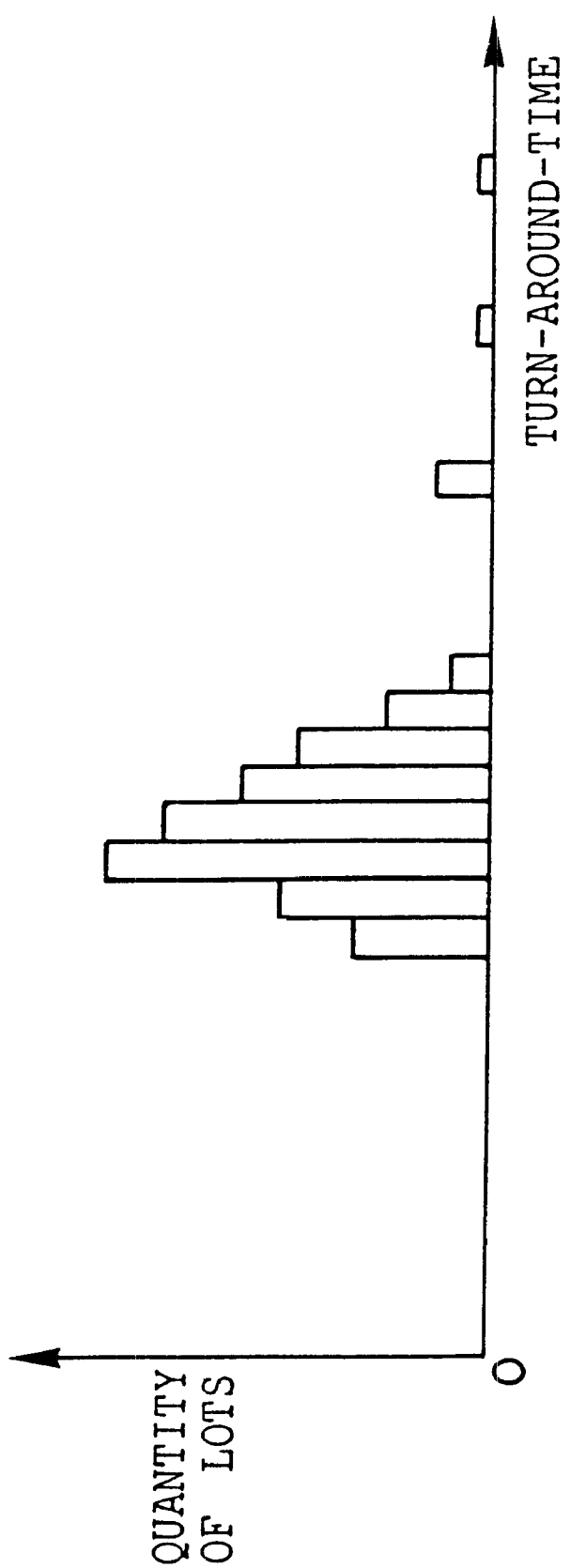
FIG. 3 is an exemplary histogram showing a result of a system for providing information regarding production progress of a mass production line in accordance with the first embodiment of this invention.

In this manner, a quantity of finished products shipped from each production stage of a mass production line for production of a production lot or the corresponding turn-around-time for each stage is obtained. Then, referring to FIG. 3, all the lots processed in a specific period e.g. a day are classified by the corresponding turn-around-time.

Referring to FIG. 3 again, the results of the calculation are plotted in a histogram having a Y-axis representing number of lots and an X-axis representing turn-around-time. This histogram is displayed on a screen of the first output means 18.

Figure 4:
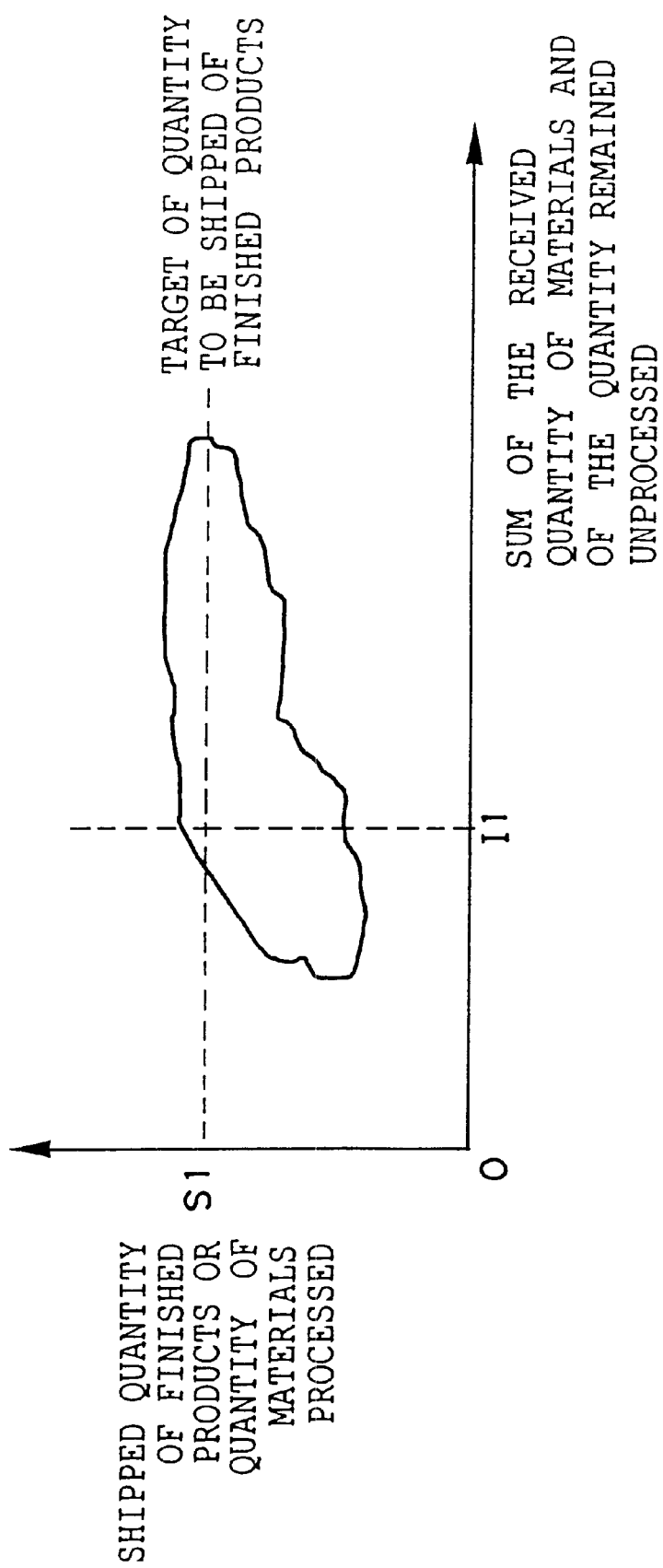
FIG. 4 is a graph showing an example of relations between the shipped quantity of finished products or the quantity of processed materials and a sum of the received quantity of materials and of the quantity of materials remained unprocessed, the relations being calculated by a system for providing information regarding production progress of a mass production line in accordance with the first embodiment of this invention.

Referring to FIG. 4, the foregoing results of calculation conducted by the first computerized means 12 can be shown in a graph having a Y-axis representing the quantity of finished products or the quantity of materials shipped or processed or the quantity of materials transferred to the next production stage from a production stage in a period e.g. a day and an X-axis representing a sum of the quantity of materials received by the same production stage in the same period e.g. the same day and the quantity of materials remained unprocessed in the same production stage in the same period e.g. in the same day.

This graph can be employed in a way described below. Namely, a manager in charge of management of a mass production line can utilize FIG. 4 to readily find a sum of the quantity of materials received by a production stage and the quantity of materials remained unprocessed in the same production stage which causes saturation for an increase of the corresponding shipped quantity of finished products or for an increase of the corresponding quantity of products transferred to the next production stage. Thus, he will decide a scheduled shipping quantity of finished products or a scheduled quantity of products transferred to the next production stage at the point $S_1$ shown in FIG. 4, and he will supply the materials at the quantity $I_1$ shown in FIG. 4. This decision will be made for any arbitrary selected production stage or for all the production stages.

As is clear from the foregoing description, the information provided by a system for providing information regarding production progress of a mass production line in accordance with the first embodiment of this invention can be a piece of information useful for minimizing a turn-around-time for production without reducing the corresponding quantity of the products to be shipped.

Second Embodiment

A system for providing information regarding production progress of a mass production line having a function to provide relations respectively between the quantity of finished products and a sum of the received quantity of materials and the quantity of materials remained unprocessed, relations between a length of period in which some of the facilities are remained under an idle position or a non-operating position and a sum of the received quantity of materials and the quantity of materials remained unprocessed for a production stage of a mass production line for production of a production lot, and relations between an average turn-around-time and a sum of the received quantity of materials and the quantity of materials remained unprocessed, for a production stage of a mass production line for production of a production lot.

Figure 5:
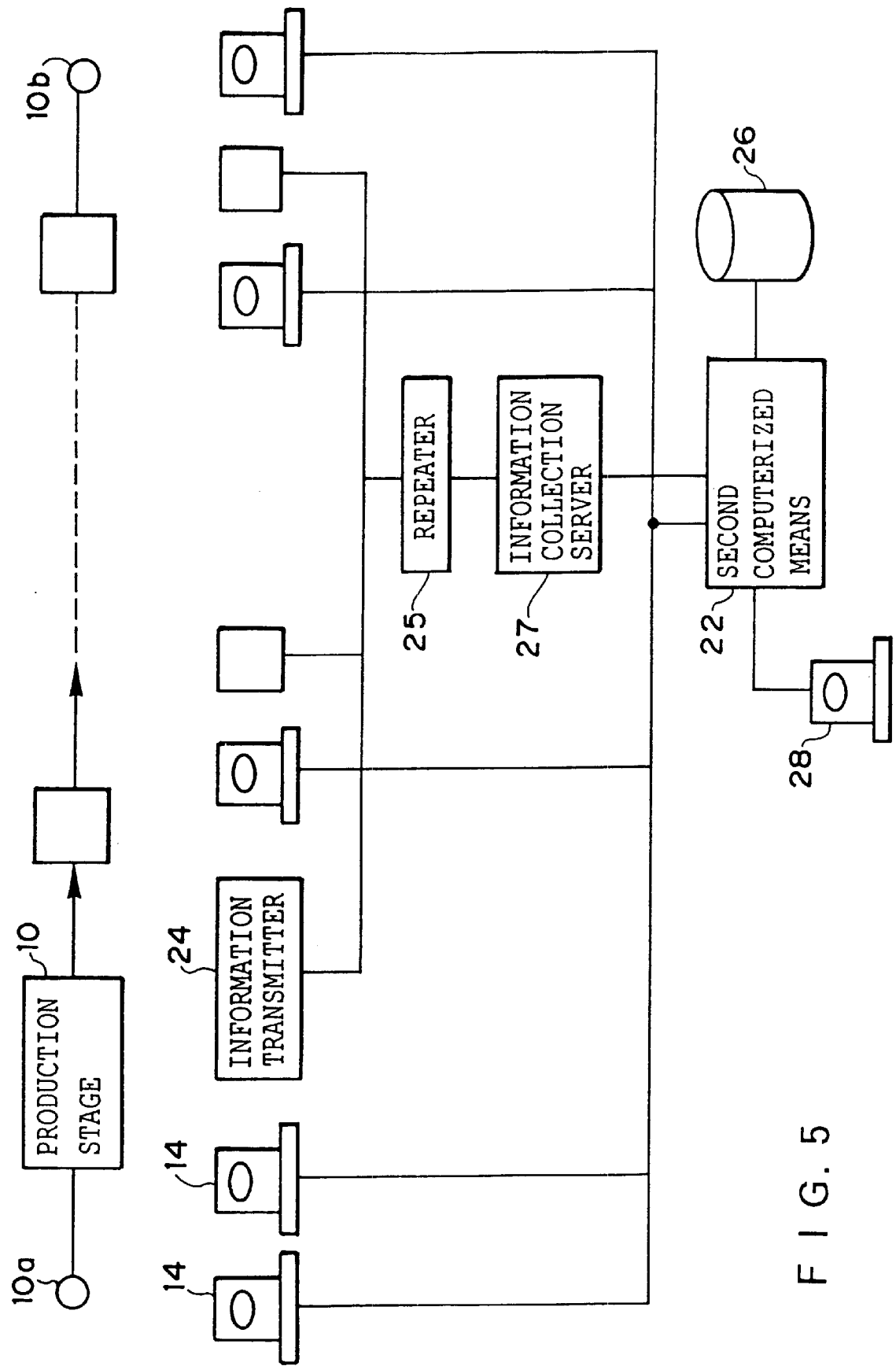
FIG. 5 is a schematic drawing illustrating general construction of a system for providing information regarding production progress of a mass production line in accordance with the second embodiment of this invention.

Referring to FIG. 5, a system for providing information regarding production progress of a mass production line in accordance with the second embodiment of this invention is composed of a second computerized means 22 which calculates and provides relations respectively between the quantity of finished products and a sum of the received quantity of materials and the quantity of materials remained unprocessed, relations between a length of period in which the facilities are remained under an idle position or a non-operating position and a sum of the received quantity of materials and the quantity of materials remained unprocessed, and relations between an average turn-around-time and a sum of the received quantity of materials and the quantity of materials remained unprocessed for a production stage of a mass production line for production of production lot, a memory means 26, plural first input means 14 for respectively inputting a quantity of materials received by a production stage of a mass production line for production of a production lot, a quantity of materials remained unprocessed at a production stage of a mass production line for production of a production lot and a quantity of finished products shipped from a production stage of a mass production line for production of a production lot, each of the plural first input means 14 being provided to each production stage 10 and the beginning $10_a$ of the mass production line and the termination thereof $10_b$, plural information transmitters 24 for transmitting information regarding the quantity of facilities provided for, a time at which an operation starts at, and a time at which an operation finishes at the production stage of a mass production line for production of a production lot, a repeater 25 for relaying the information given by the plural information transmitters 24, an information collection server 27 for receiving the information relayed by the repeater 25, for compiling information and for transmitting the compiled information toward the second computerized means 22, and a second output means 28 for outputting results of the second computerized means 22. The second output means 28 can be display means. Each of the information transmitters 24 is a personal computer installed by the side of each of the production facilities allotted to each of the production stages, and they are employed to transmit the foregoing information regarding the production line, the information including a quantity of facilities provided for, a time at which an operation starts at, and a time at which an operation finishes at the production stage of a mass production line for production of a production lot.

The information collection server 27 prepares a piece of information representing the time used for a process for each production stage, a length of period in which the one of the facilities suspends operation, and a reason for each suspension of the one of the facilities.

The information regarding the preparatory labor such as a change of jigs et al. is manually inputted from each of the personal computers 24.

The time at which each of the production facilities allotted to each of the production stages starts the operation and finishes the operation, is manually inputted from each of the personal computers 24 as well, to be transmitted toward the information collection server 27 to be employed therein to calculate a length of period for which each of the facilities is used, an operation rate of each of the facilities, an non-operation rate of each of the facilities, an operation record of each of the facilities and an operation history of each of the facilities, et al.

Figure 6:
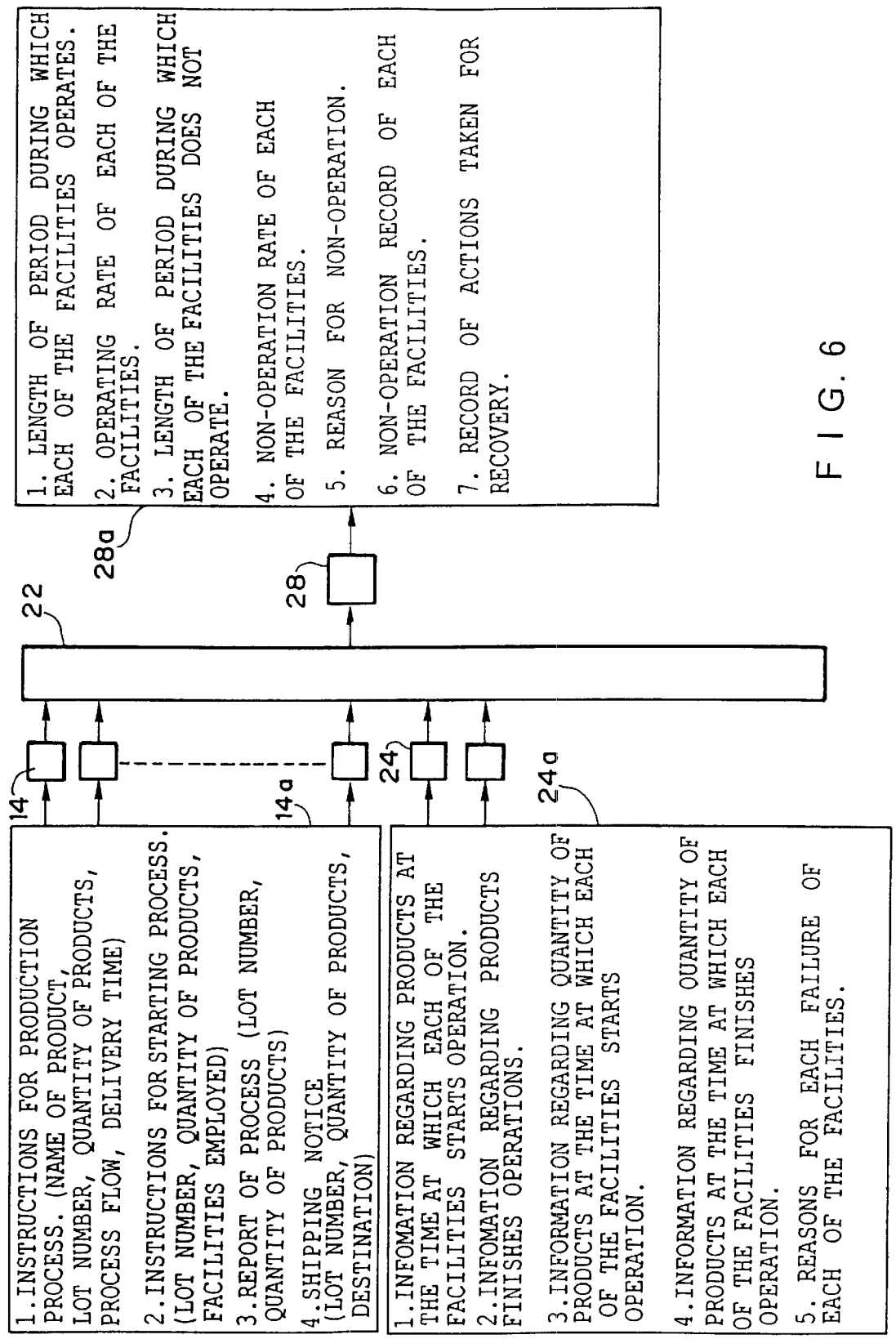
FIG. 6 is a schematic drawing itemizing information received by and outputted from the system for providing information regarding production progress of a mass production line in accordance with the second embodiment of this invention.

Referring to FIG. 6, the source information inputted by each of the input means $14_a$ is entirely identical to that which is shown for the first embodiment. In addition, the source information inputted by each of the information transmitters 24 is itemized below, as shown by a label $24_a$ in FIG. 6.

1. Information regarding the products at the time at which each of the facilities starts operation.
2. Information regarding the products at the time at which each of the facilities finishes operation.
3. Information regarding the quantity of the products at the time at which each of the facilities starts operation.
4. Information regarding the quantity of the products at the time at which each of the facilities finishes operation.
5. The reasons for each suspension of operation of each of the facilities.

Receiving foregoing pieces of information, the second computerized means 22 calculates the information regarding the relations between the quantity of the shipped products and the corresponding quantity of materials employed, and the information regarding the idle time of each of the production facilities for each production stage. In addition, the second computerized means 22 calculates the information regarding the average turn-around-time for each production stage. Further, the second computerized means 22 prepares a graph showing the relations between the shipped quantity of products, the idle time of each of the production facilities and the average turn-around-time and the corresponding quantity of materials supplied.

The information outputted from the second output means 28 is itemized below, as shown by a label $28_a$ in FIG. 6.

1. The length of period during which each of the facilities is operating.
2. The operation rate of each of the facilities.
3. The length of period during which each of the facilities is not operating.
4. The idle rate or the non-operation rate of each of the facilities.
5. Reasons for the non-operation of each of the facilities.
6. Non-operation record of each of the facilities.
7. Record of the actions taken for recovery of each of the facilities.

Figure 7:
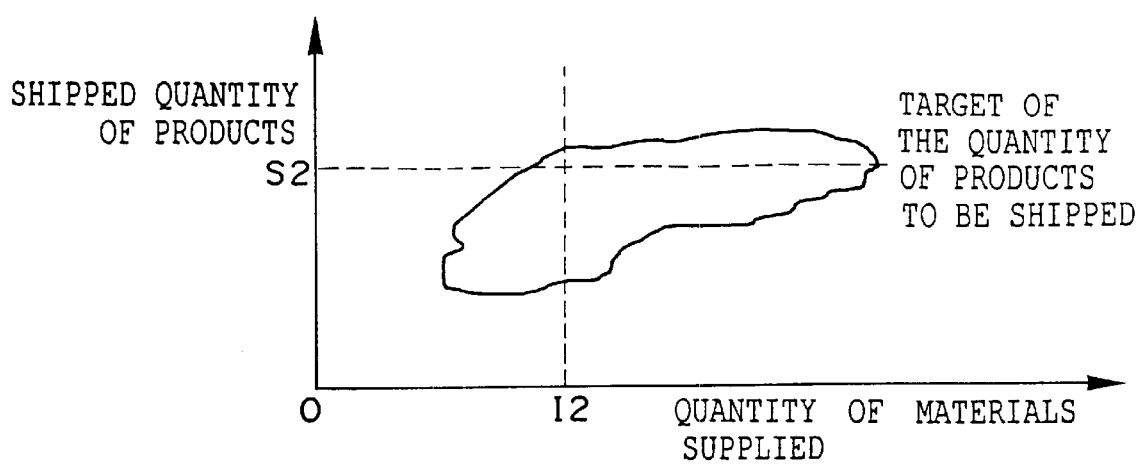
FIG. 7 is a graph showing an example of relations between the shipped quantity of products and the quantity of materials supplied, the relations being calculated by a system for providing information regarding production progress of a mass production line in accordance with the second embodiment of this invention.

Referring to FIG. 7, the relations between the shipped quantity of products and the corresponding quantity of materials supplied are shown by a graph.

As is in the case of the first embodiment, a manager in charge of management of a mass production line can utilize FIG. 7 to readily find a quantity of materials supplied which causes saturation for an increase of the corresponding quantity of the shipped product. Thus, he will decide a scheduled quantity of the shipping products at the point $S_2$ shown in FIG. 7, and he will supply the material at the quantity $I_2$ shown in FIG. 7.

Figure 8:
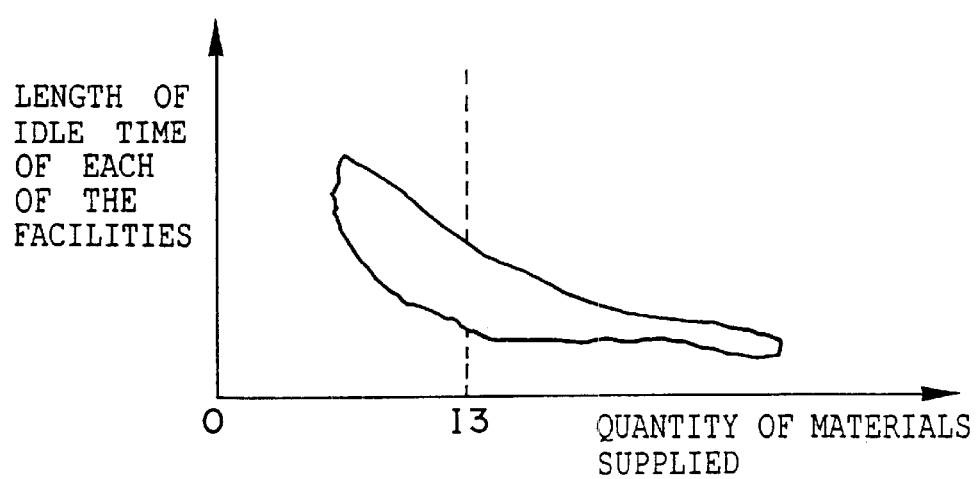
FIG. 8 is a graph showing an example of relations between the length of idle time of each of the facilities and the quantity of materials supplied, the relations being calculated by a system for providing information regarding production progress of a mass production line in accordance with the second embodiment of this invention.

Referring to FIG. 8, the relations between the length of the idle time of each of the production facilities and the corresponding quantity of materials supplied are shown by a graph. A manager m charge of management of a mass production line can utilize FIG. 8 to readily find a quantity of materials supplied which does not cause an increase of the corresponding length of idle time of each of the production facilities. Thus, he will select a scheduled quantity of materials supplied at the quantity $I_3$ shown in FIG. 8 for the purpose not to increase a length of idle time of each of the production facilities.

Figure 9:
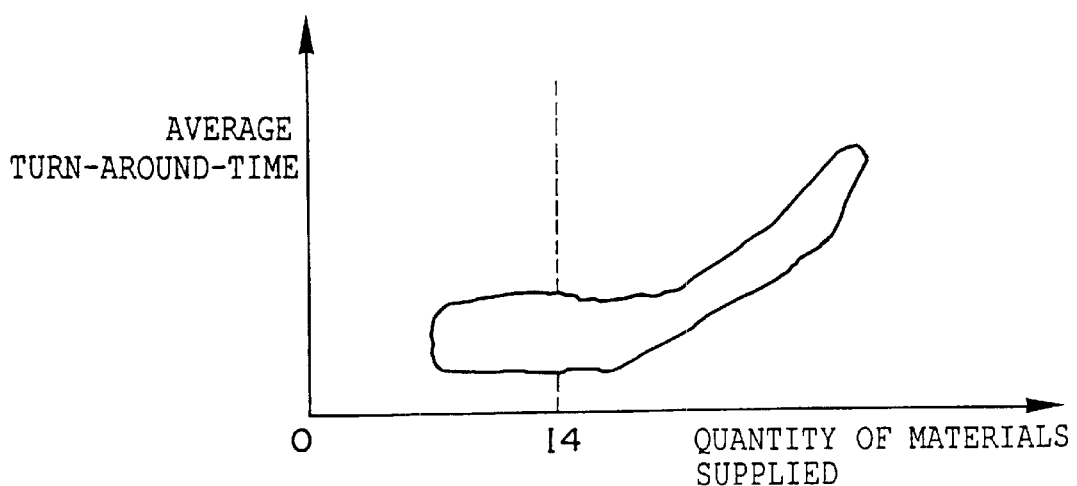
FIG. 9 is a graph showing an example of relations between the average turn-around-time and the quantity of materials supplied, the relations being calculated by a system for providing information regarding production progress of a mass production line in accordance with the second embodiment of this invention.

Referring to FIG. 9, the relations between the average turn-around-time and the corresponding quantity of materials supplied are shown by a graph. A manager in charge of management of a mass production line can utilize FIG. 9 to readily find a quantity of materials supplied which causes an increase of the corresponding turn-around-time. Thus, he will select a scheduled quantity of materials supplied at the quantity $I_4$ shown in FIG. 9 for the purpose not to increase an average turn-around-time.

In this manner, the resultant information of the system for providing information regarding production progress of a mass production line in accordance with the second embodiment of this invention is useful for managerial efforts to secure a sufficient level of shipped quantity of the product, while keeping the corresponding level of the length of idle time of each of the facilities and of the turn-around-time of each production stage. Incidentally, the foregoing resultant information is useful to reduce an average turn-around-time of each production stage, while keeping the length of idle time of each of the facilities less and the shipped quantity of the product at a satisfactory level.

Third Embodiment

A system for providing information regarding production progress of a mass production line having a function to provide a length of period in which the facilities are busy, a length of period during which no work is conducted and a length of period during which materials or finished products are carried from a production stage to the next production stage, for each production stage of a mass production line for production of a production lot.

Figure 10:
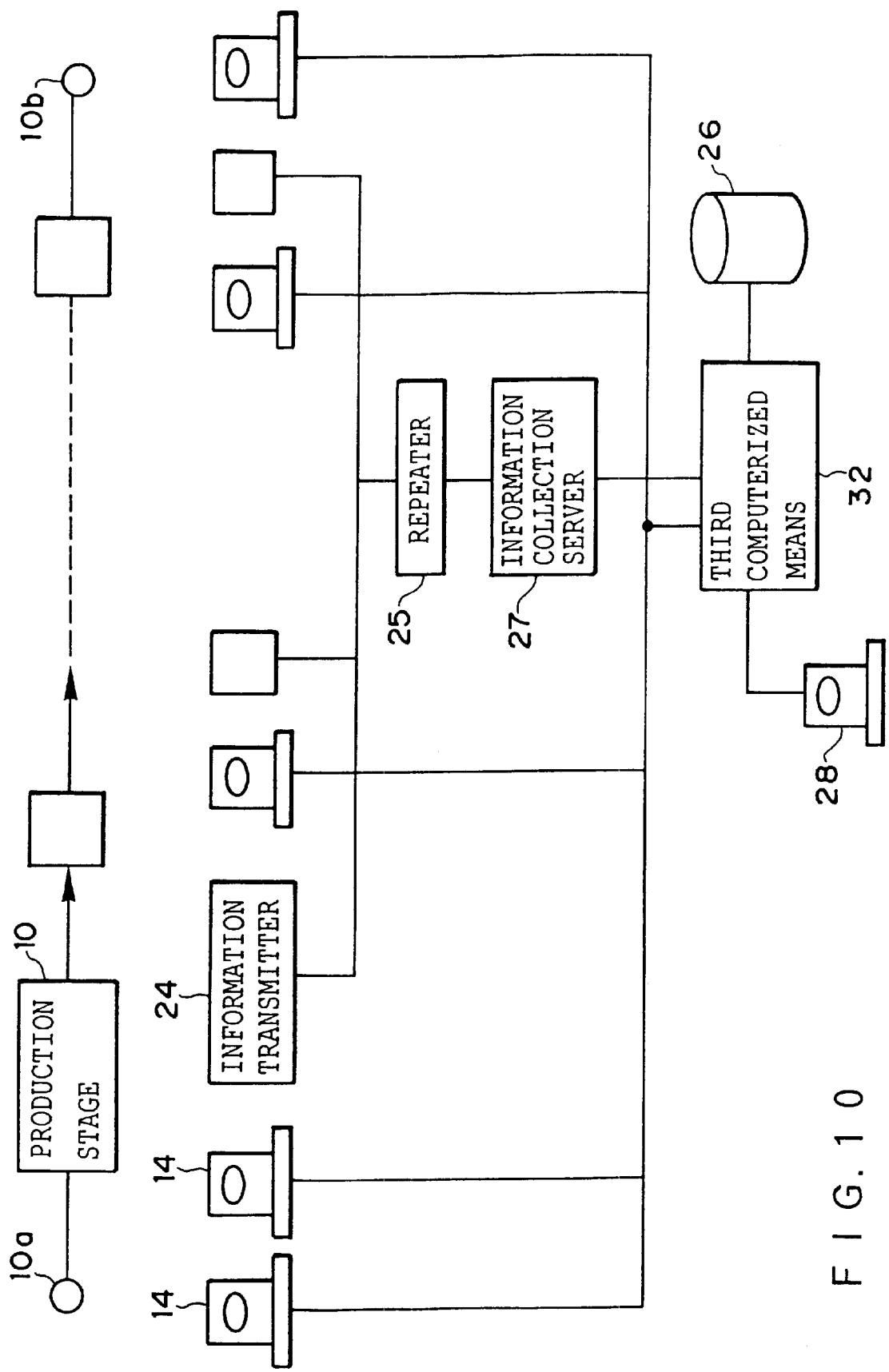
FIG. 10 is a schematic drawing illustrating general construction of a system for providing information regarding production progress of a mass production line in accordance with the third embodiment of this invention.

Referring to FIG. 10, a system for providing information regarding production progress of a mass production line in accordance with the third embodiment of this invention is composed of a third computerized means which calculates and provides a length of period during which the facilities are busy, a length of period during which no work is conducted, and a length of period during which materials or finished products are carried between production stages of a mass production line for production of a production lot, a memory means 26, plural first input means 14 for respectively inputting a quantity of materials received by a production stage of a mass production line for production of a production lot, a quantity of materials remained unprocessed at a production stage of a mass production line for production of a production lot, a quantity of finished products shipped from a production stage of a mass production line for production of a production lot, each of the plural first input means 14 being provided to each production stage 10 and the beginning $10_a$ of the mass production line and the termination thereof $10_b$, plural information transmitters 24 for transmitting information regarding a quantity of facilities provided for, a time at which an operation starts at, and a time at which an operation finishes at a production stage of a mass production line for production of a production lot, a repeater 25 for relaying the information given by each of the information transmitters 24, an information collection server 27 for receiving the information relayed by the repeater 25, for compiling information and for transmitting the compiled information toward the third computerized means 32, and a second output means 28 for outputting results of the third computerized means 32. The second output means 28 can be display means. The details of the information transmitters 24, the repeaters 25 and the information collection server 27 et al. are identical to those presented in the description for the second embodiment.

The third computerized means 32 calculates a turn-around-time for each production stage. The source information employed for this calculation is the time at which the corresponding process starts and the time at which the corresponding process finishes. Secondly, the third computerized means 32 calculates a length of period during which each of the facilities is operating as well. The source information employed for this calculation is a piece of information regarding the operation of each of facilities. Thirdly, the third computerized means 32 calculates a length of period during which no work was conducted. This calculation is made by subtracting the length of period during which each of the facilities is operating, from the corresponding turn-around-time. Fourthly, the third computerized means 32 calculates a length of period during which materials are being transferred from a production stage to the next production stage. This calculation is made by subtracting the time at which the process starts for a production process, from the time at which the previous process finishes for the immediately preceding production process from the corresponding turn-around-time.

Figure 11:
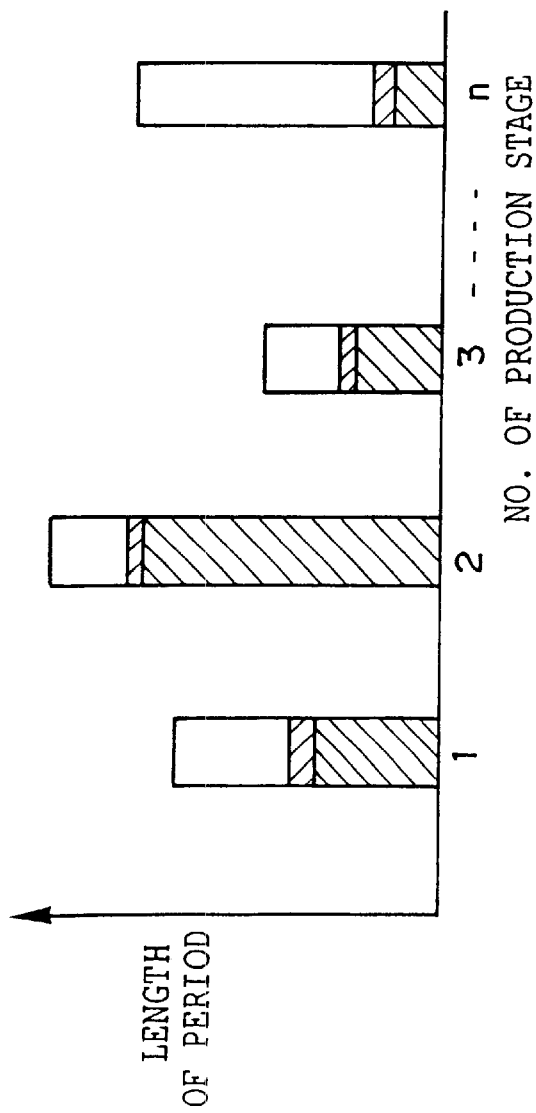
FIG. 11 is a histogram showing a combination of a length of period during which materials are being transferred from a production stage to the next production stage, a length of period during which period no work was conducted and a length of period during which each of the facilities is operating for each production stage, the information being calculated by a system for providing information regarding production progress of a mass production line in accordance with the third embodiment of this invention.
Figure 12:
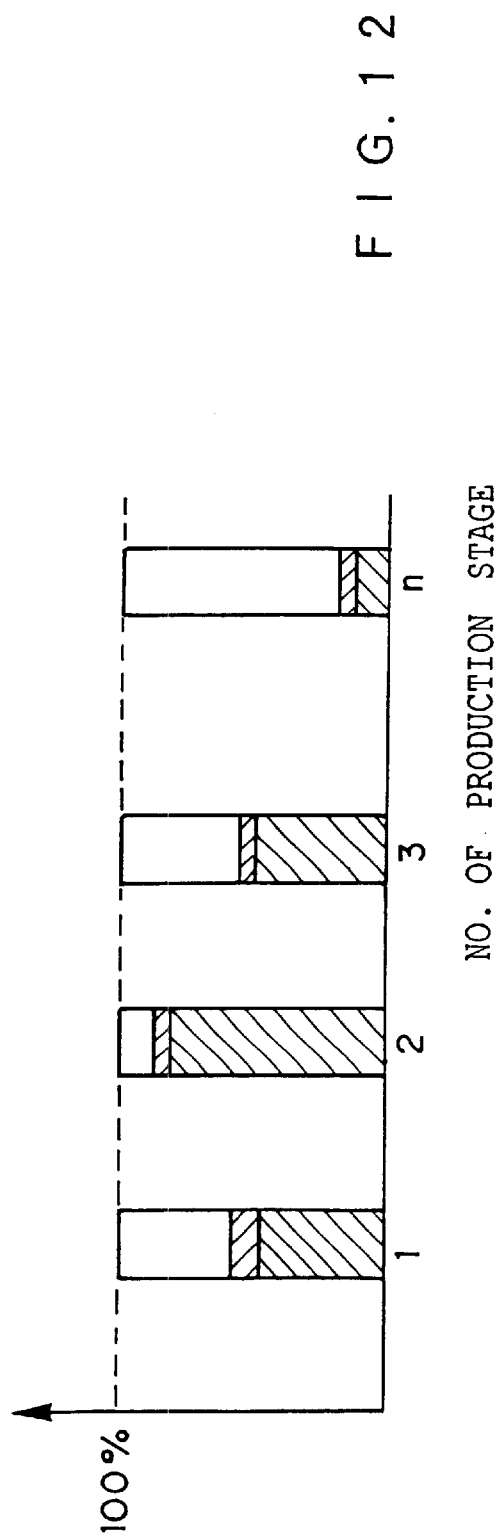
FIG. 12 is a histogram showing a combination of a length of period during which materials are being transferred from a production stage to the next production stage, a length of period during which no work was conducted and a length of period during which each of the facilities is operating for each production stage, the information being calculated by a system for providing information regarding production progress of a mass production line in accordance with the third embodiment of this invention, and the histogram showing the information in terms of a ratio.

Referring to FIG. 11, a combination of a length of period during which materials are being transferred from a production stage to the next production stage, a length of period during which no work was conducted and a length of period during which each of the facilities is operating, can be shown as a histogram for each production stage. The combination of a length of period during which materials are being transformed from a production stage to the next production stage, a length of period during which no work was conducted and a length of period during which each of the facilities is operating, can be shown in terms of a ratio of each ingredient of the foregoing information, as is shown in FIG. 12.

A manager in charge of management of a mass production line can readily utilize the foregoing information to determine parameters which disturb the efficiency of the mass production line.

Forth Embodiment

A system for providing information regarding production progress of a mass production line having a first function for finding whether or not some quantity of materials are remained unprocessed, whenever any of the facilities suspends operation, a second function for determining that the reason why some of the facilities are remained under an idle position is a lack of laborers, in the case where some quantity of materials is available for accepting process, and that the reason why the facilities are remained under an idle position is a lack of materials, in the case where none of materials is available for accepting process, in addition to the function of the third embodiment.

Figure 13:
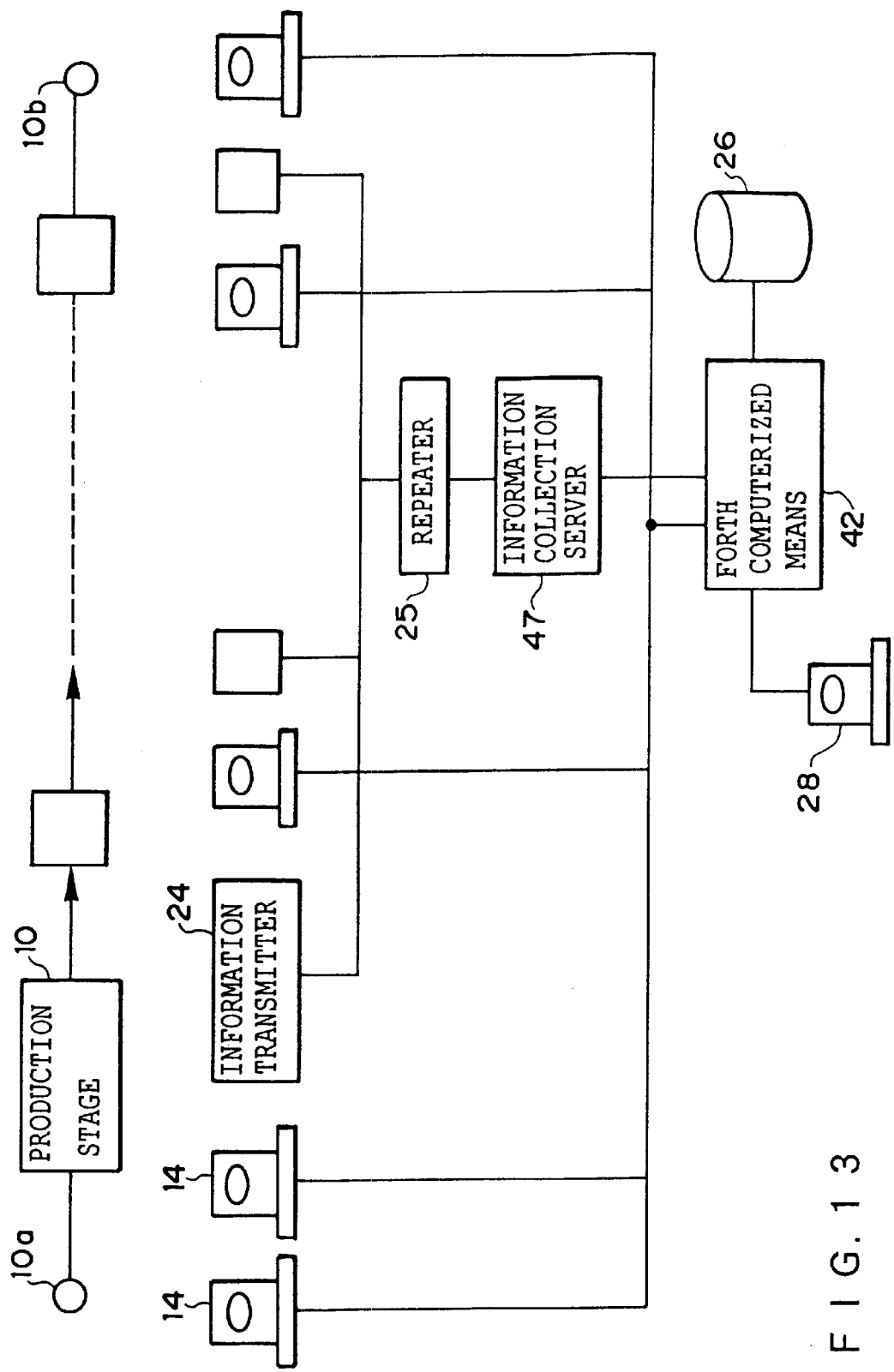
FIG. 13 is a schematic drawing illustrating general construction of a system for providing information regarding production progress of a mass production line in accordance with the fourth embodiment of this invention.

Referring to FIG. 13, a system for providing information regarding production progress of a mass production line in accordance with the fourth embodiment of this invention is composed of a fourth computerized means 42 which has a first function for finding whether or not some quantity of materials are remained unprocessed, whenever any of the facilities suspends operation, a second function for determining the reason why some of the facilities are remained under an idle position is a lack of laborers, in the case where some quantity of materials is available for accepting process, and the reason why some of the facilities are remained under an idle position is a lack of materials, in the case where none of materials is available for accepting process, a memory means 26, plural first input means 14 respectively inputting a quantity of materials received by a production stage of a mass production line for production of a production lot, a quantity of materials remained unprocessed at a production stage of a mass production line for production of a production lot and a quantity of finished products shipped from a production stage of a mass production line for production of a production lot, each of the plural first input means 14 being provided to each production stage 10 and the beginning 10$_a$ of the mass production line and the termination 10$_b$ thereof, plural information transmitters 24 for transmitting information regarding the quantity of facilities provided for, a time at which an operation starts at, and a time at which an operation finishes at a production stage of a mass production line for production of a production lot, a repeater 25 for relaying the information given by the plural information transmitters 24, an information collection server 27 for receiving the information relayed by the repeater 25, for compiling information, and for transmitting the compiled information toward the fourth computerized means 42, and a second output means 28 for outputting result of the fourth computerized means 42. The second output means 28 can be display means. The details of the information transmitter 24, the repeaters 25 and the information collection server 27 et al. are identical to those presented in the description for the second embodiment.

Figure 14:
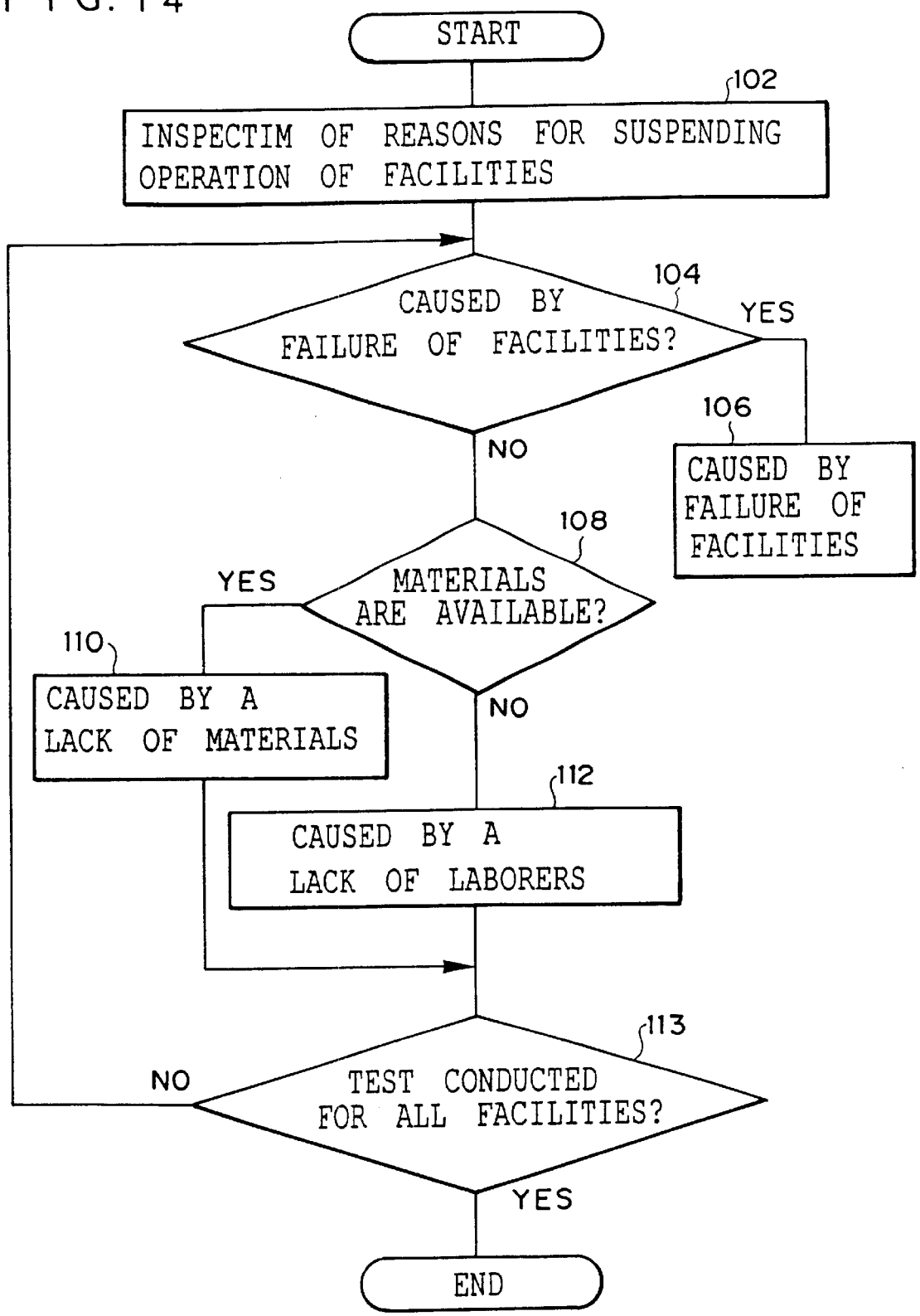
FIG. 14 is a flow chart of a subroutine employed in a system for providing information regarding production progress of a mass production line in accordance with the fourth embodiment of this invention.

The information collection server 47 and the fourth computerized means 42, in combination, conducts a subroutine of which each step will be described below, referring to FIG. 14.

(1) Step 102

Inspection is conducted for each of the signals indicating the reasons for suspending operation of each of the production facilities.

(2) Step 104

The reasons for suspending operation of each of the production facilities are divided into those which are caused by a failure of or a malfunction of the corresponding one of the production facilities and those which are not caused by a failure of or a malfunction of the corresponding one of the production facilities.

(3) Step 106 If the answer for the step 104 is YES, the reasons for suspending operation of each of the production facilities are determined to be failures of the corresponding one of the production facilities.

(4) Step 108

If the answer for the step 104 is No, an inspection is conducted whether or not some quantity of materials is available for the corresponding one of the production facilities.

(5) Step 110

If the answer for the step 108 is YES, the reason for suspending operation of each of the production facilities is determined to be a lack of laborers.

(6) Step 112

If the answer for the step 108 is NO, the reason for suspending operation of each of the production facilities is determined to be a lack of materials.

(7) Step 113

The foregoing tests are repeated until all the production facilities are covered.

In this manner, lengths of period during which one of the facilities allotted to a production line suspends operation, are automatically classified to cases in which one of the facilities suspends operation are caused by a lack of laborers and to cases in which one of the facilities suspends operation are caused by a lack of materials. It is noted that the classification is manually conducted by laborers attending to the corresponding production stage.

Figure 15:
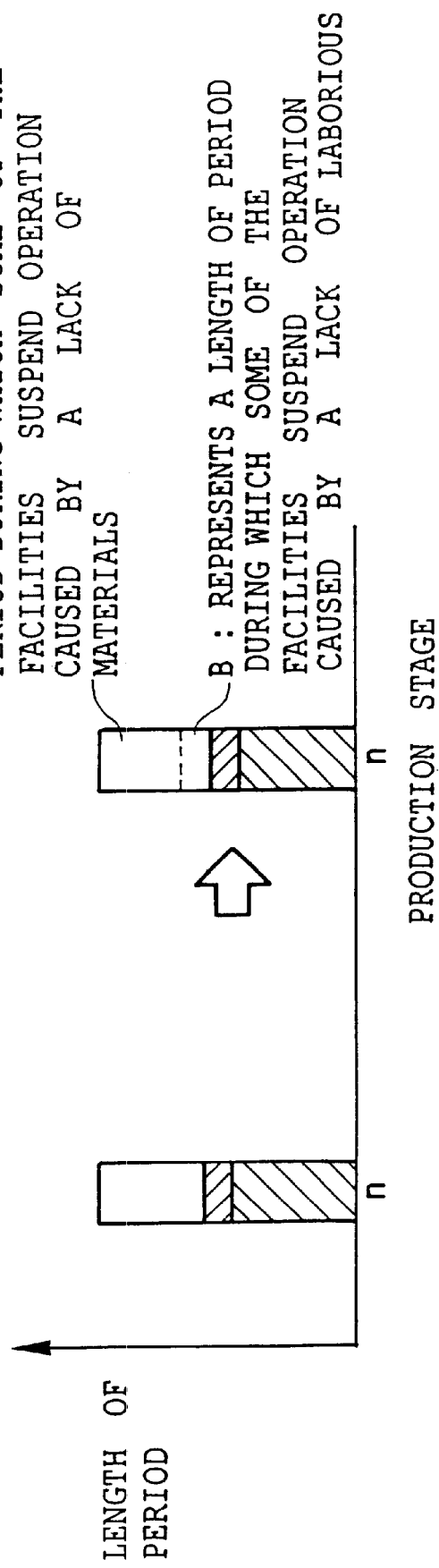
FIG. 15 is a graph showing an exemplary result calculated by a system for providing information regarding production progress of a mass production line in accordance with the fourth embodiment of this invention.

The foregoing information can be shown by a graph shown in FIG. 15 to be displayed on a screen of the display means 28.

A manager in charge of management of a mass production line can readily utilize the visual information displayed of the display means 28 for identifying the reason for the suspension of the operation of the specified. If the reason is a lack of laborers, he will go to the office of a personnel manager for requesting more laborers. If the reasons is a lack of materials, he will expedite supply of materials.

Fifth Embodiment

A system for providing information regarding production progress of a mass production line having a function for finding whether or not a sum of the received quantity of materials and the quantity of materials remained unprocessed is in excess of a maximum allowable quantity of materials remained unprocessed for a production stage of a mass production line for production of a production lot, a function for inputting a reason causing a position in which the quantity of materials remained unprocessed is in excess of a maximum allowable quantity of materials for a production stage, and a function for displaying a histogram showing the foregoing relations, in addition to the function of the fourth embodiment.

Figure 16:
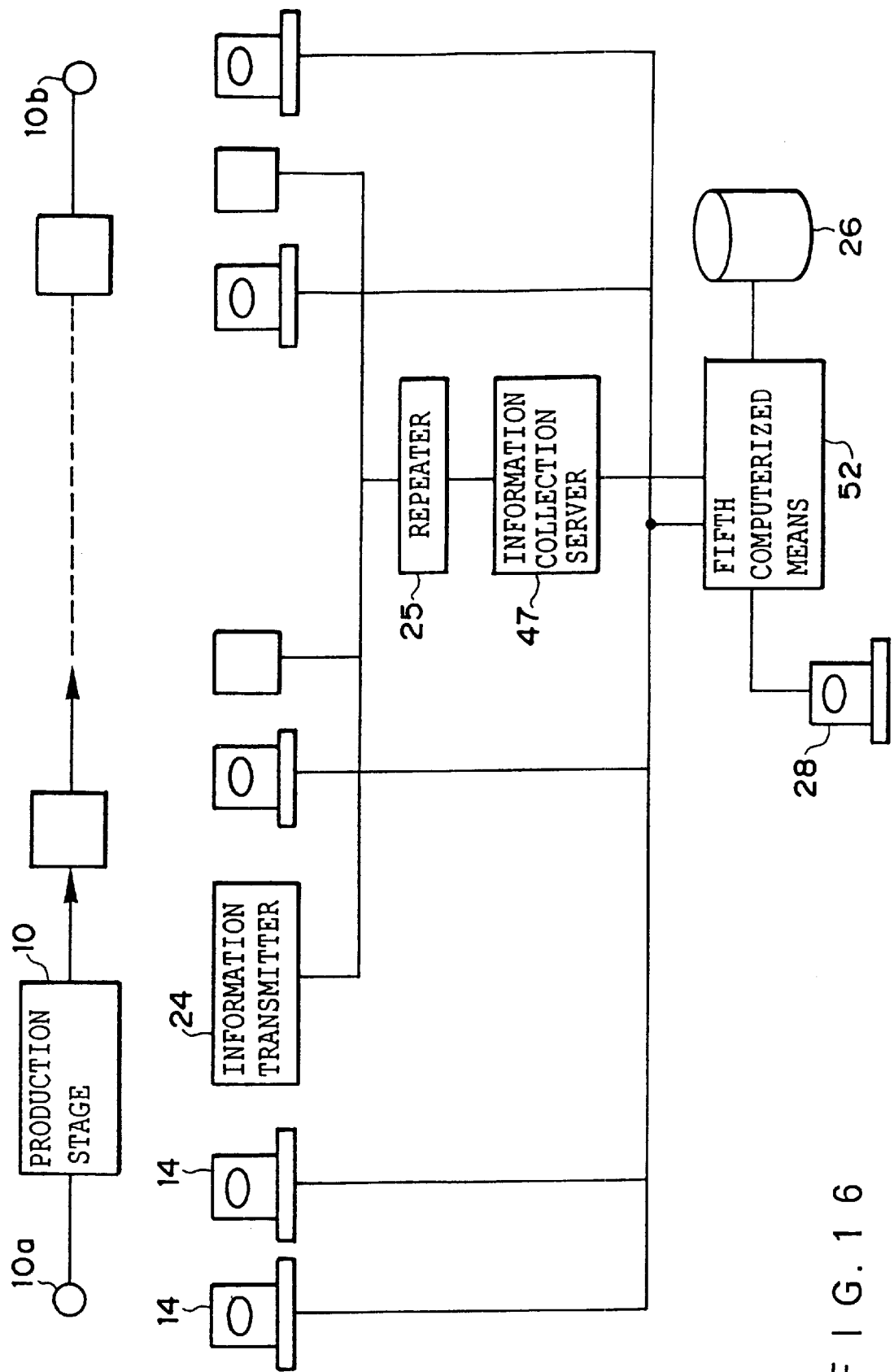
FIG. 16 is a schematic drawing illustrating general construction of a system for providing information regarding production progress of a mass production line in accordance with the fifth embodiment of this invention.

Referring to FIG. 16, a system for providing information regarding production progress of a mass production line in accordance with the fifth embodiment of this invention is composed of a fifth computerized means 52 which has a function for finding whether or not a sum of the received quantity of materials and the quantity of materials remained unprocessed is in excess of a maximum allowable quantity of materials remained unprocessed and an input means for inputting a reason causing a position in which the quantity of materials remained unprocessed is in excess of a maximum allowable quantity of materials remained unprocessed, a display means for displaying a histogram representing results of the fifth computerized means 52, in addition to all the members of the systems for providing information regarding production progress of a mass production line in accordance with the forth embodiment.

Figure 17:
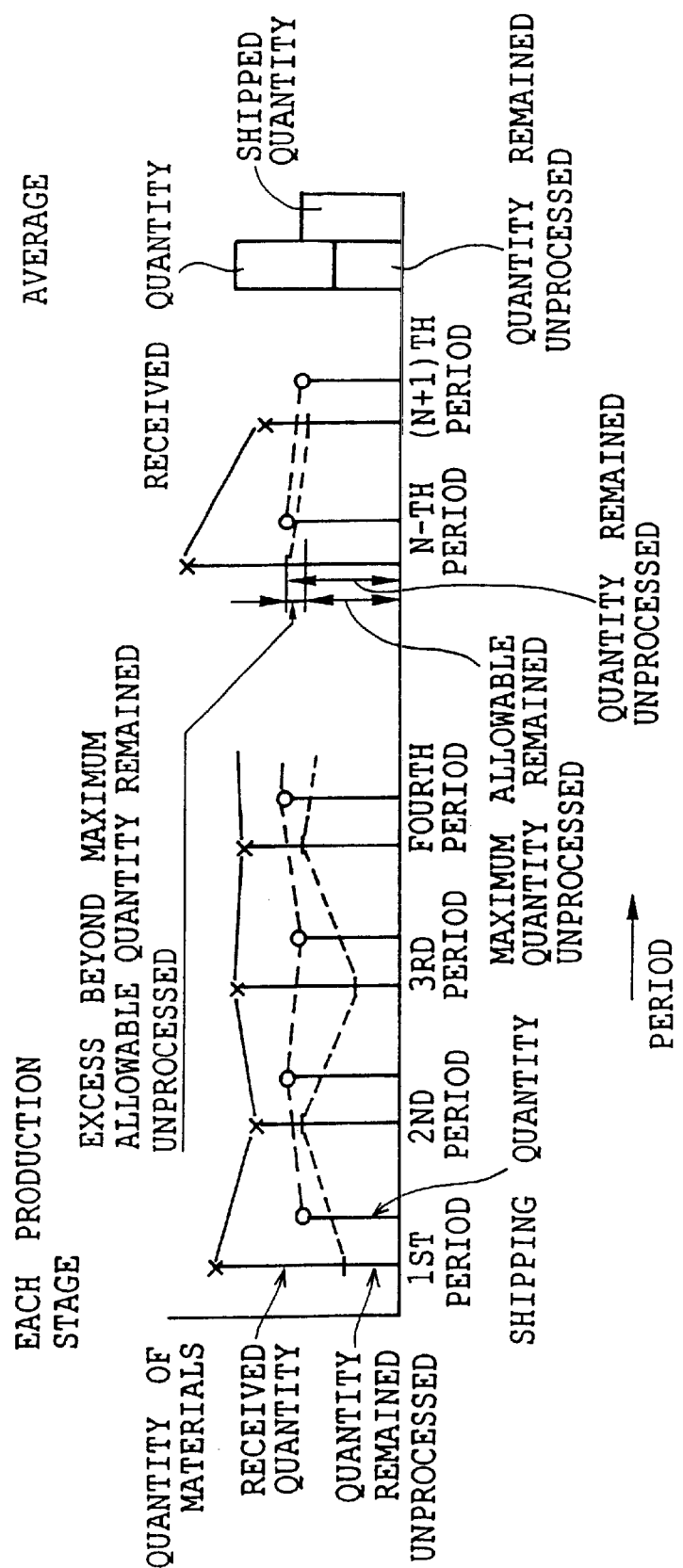
FIG. 17 is a histogram showing the relations between the quantity of materials received and remained unprocessed during an arbitrary period e.g. a day and the quantity of materials shipped in the same period, the relations being calculated by a system for providing information regarding production progress of a mass production line in accordance with the fifth embodiment of this invention.

Referring to FIG. 17, the system for providing information regarding production progress of a mass production line in accordance with the fifth embodiment of this invention prepares a histogram showing the relations between the quantity of materials received and the quantity of materials remained unprocessed during an arbitrary period e.g. a day and the quantity of materials shipped in the same period and a histogram showing the average of the foregoing quantity, for each production stage, and displays the same.

A manager in charge of management of a mass production line can readily utilize the histogram to determine the maximum allowable quantity of materials remained unprocessed for each production stage, and inputs the same in the system.

Whenever a quantity of materials remained unprocessed at any production stage exceeds the foregoing maximum allowable quantity of materials remained unprocessed, the system issues an alarm, which can be a visual one, an oral one or any other type.

The above is employable for monitoring a position in which a quantity of materials remained unprocessed at any production stage exceeds the foregoing maximum allowable quantity of materials remained unprocessed.

Receiving such an alarm, a manager in charge of management of a mass production line investigates the reason for the excess position, which may be an over supply of materials, a failure of some of the production facilities or a lack of laborers. He will input his findings in the system. If the assumed potential results are previously coded, it would be convenient for his inputting job.

FIG. 17 can be displayed on the input means 14 allotted to the corresponding production stage. This is effective to call an attention of a manager in charge of the specific production stage or a laborer attending to the specific production stage.

Figure 18:
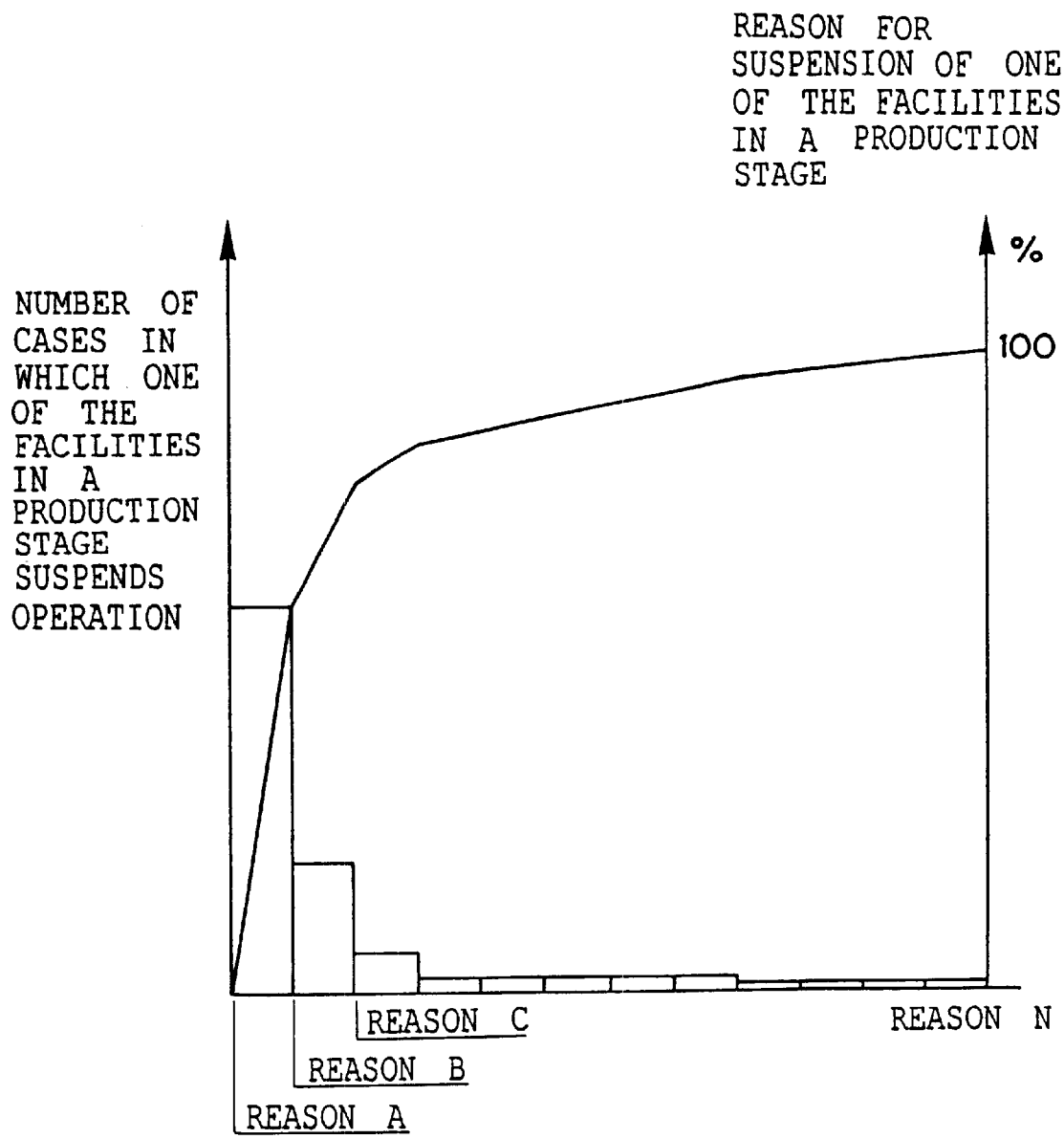
FIG. 18 is a histogram showing the relations between the number of cases in which one of the facilities in a production stage, suspends its operation and a reason for the foregoing suspension of operation every specific period, the relations being calculated by a system for providing information regarding production progress of a mass production line in accordance with the fifth embodiment of this invention.

Referring to FIG. 18, the system for providing information regarding production progress of a mass production line in accordance with the fifth embodiment of this invention prepares a histogram showing the relations between the number of cases in which one of the facilities in a production stage suspends its operation and a reason for the foregoing suspension of operation, every specific period e.g. every week, every month, et at, and displays the histogram on the display means 28.

A manager in charge of management of a mass production line can readily utilize the histogram to find the priority of the foregoing reasons. He will use his efforts to remove the reasons having a higher priority, for the purpose to reduce a turn-around-time for each production stage.

The foregoing description has clarified that this invention has successfully provided a variety of systems for providing information regarding production progress of a mass production line each of, which is effective to assist a manager in charge of management of a mass production line for making some decision on various parameters regarding further progress of the mass production line.

Although this invention has been described with reference to specific embodiments, this description is not meant to be construed in a limiting sense. Various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A system for providing information regarding production process comprising:

a plurality of first input means for respectively inputting a quantity of materials received by, a quantity of materials remained unprocessed at and a quantity of finished products shipped from a production stage of a mass production line for production of a production lot, a first computerized means for calculating relations between said quantity of finished products and a sum of said received quantity of materials and said quantity of materials remained unprocessed, for a production stage of a mass production line for production of production lot, and a first output means for outputting said relations between said quantity of finished products and said sum of said received quantity of materials and said quantity of materials remained unprocessed, for a production stage of a mass production line for production of a production lot.

2. A system for providing information regarding production process in accordance with claim 1, wherein said relations are expressed in a graph and said first output means is display means.

3. A system for providing information regarding production progress in accordance with claim 1, further comprising:

a fifth computerized means for finding whether or not a sum of said received quantity of materials and said quantity of materials remained unprocessed is in excess of a maximum allowable quantity of materials remained unprocessed for a production stage of a mass production line for production of a production lot, and a means for informing results of said fifth computerized means, in an occasion that said sum of said received quantity of materials and said quantity of materials remained unprocessed is found to be in excess of said maximum allowable quantity of materials remained unprocessed for an arbitrary production stage of a mass production line for production of a production lot.

4. A system for providing information regarding production progress in accordance with claim 3, further comprising:

a plurality of second input means for respectively inputting a reason for causing a position in which the quantity of materials remained unprocessed is in excess of a maximum allowable quantity of materials remained unprocessed, for a production stage of a mass production line for production of a production lot, in an occasion that a sum of said received quantity of materials and said quantity of materials remained unprocessed is in excess of a maximum allowable quantity of materials remained unprocessed, for a production stage of a mass production line for production of a production lot, a memory means for memorizing said reason for causing said position in which the quantity of materials remained unprocessed is in excess of said maximum allowable quantity of materials, a plurality of computerized means for preparing a histogram representing a quantity of said position in which the quantity of materials remained unprocessed is in excess of a maximum allowable quantity of materials, and a plurality of fifth output means for displaying said histogram.

5. A system for providing information regarding production process comprising:
- a plurality of first input means for respectively inputting a quantity of materials received by, a quantity of materials remained unprocessed at and a quantity of finished products shipped from a production stage of a mass production line for production of a production lot,
- a plurality of second input means for respectively inputting a quantity of facilities provided for, a time at which an operation starts at, and a time at which an operation finishes at said production stage of a mass production line for production of a production lot,
- a second computerized means for calculating relations between said quantity of finished products and a sum of said received quantity of materials and said quantity of materials remained unprocessed, relations between a length of period during which some of said facilities are remained under an idle position and a sum of said received quantity of materials and said quantity of materials remained unprocessed and relations between an average turn-around-time and a sum of said received quantity of materials and said quantity of materials remained unprocessed for a production stage of a mass production line for production of a production lot, and
- a first output means for outputting said relations respectively between said quantity of finished products and said sum of said received quantity of materials and said quantity of materials remained unprocessed, said relations between a length of period in which some of said facilities are remained under an idle position and said sum of said received quantity of materials and said quantity of materials remained unprocessed, and relations between said average turn-around-time and said sum of said received quantity of materials and said quantity of materials remained unprocessed for a production stage of a mass production line for production of a production lot.

6. A system for providing information regarding production progress in accordance with claim 5, wherein said relations are expressed in a graph and said first output means is display means.

7. A system for providing information regarding production progress in accordance with claim 5, further comprising:
- a third computerized means for calculating a length of period during which said facilities are busy, a length of period during which no work is conducted and a length of period during which materials or finished products are carried from a production stage to the next production stage of a mass production line for production of a production lot.

8. A system for providing information regarding production progress in accordance with claim 7, wherein said relations are expressed in a graph and said first output means is display means.

9. A system for providing information regarding production progress in accordance with claim 7, further comprising:
- a fourth computerized means having a first function for finding whether or not materials are remained unprocessed, whenever any of said facilities suspends operation, a second function for determining said period during which some of said facilities are remained under an idle position is caused by a lack of laborers, in the case where some quantity of materials is available for accepting a process, and said period during which some of said facilities are remained under an idle position is caused by a lack of materials, in the case where none of the materials is available for accepting a process, and
- a fourth output means for outputting results of said fourth computerized means.

10. A system for providing information regarding production progress in accordance with claim 9, wherein said relations are expressed in a graph and said first output means is display means.

11. A system for providing information regarding production progress in accordance with claim 1, further comprising:
- a fifth computerized means for finding whether or not a sum of said received quantity of materials and said quantity of materials remained unprocessed is in excess of a maximum allowable quantity of materials remained unprocessed for a production stage of a mass production line for production of a production lot, and
- a means for informing results of said fifth computerized means, in an occasion that said sum of said received quantity of materials and said quantity of materials remained unprocessed is found to be in excess of said maximum allowable quantity of materials remained unprocessed for an arbitrary production stage of a mass production line for production of a production lot.

12. A system for providing information regarding production progress in accordance with claim 11, further comprising:
- a plurality of second input means for respectively inputting a reason for causing a position in which the quantity of materials remained unprocessed is in excess of a maximum allowable quantity of materials remained unprocessed, for a production stage of a mass production line for production of a production lot, in an occasion that a sum of said received quantity of materials and said quantity of materials remained unprocessed is in excess of a maximum allowable quantity of materials remained unprocessed, for a production stage of a mass production line for production of a production lot,
- a memory means for memorizing said reason for causing said position in which the quantity of materials remained unprocessed is in excess of said maximum allowable quantity of materials,
- a plurality of computerized means for preparing a histogram representing a quantity of said position in which the quantity of materials remained unprocessed is in excess of a maximum allowable quantity of materials, and
- a plurality of output means for displaying said histogram.

13. A system for providing information regarding production progress in accordance with claim 7, further comprising:
- a fifth computerized means for finding whether or not a sum of said received quantity of materials and said quantity of materials remained unprocessed is in excess of a maximum allowable quantity of materials remained unprocessed for a production stage of a mass production line for production of a production lot, and
- a means for informing results of said fifth computerized means, in an occasion that said sum of said received quantity of materials and said quantity of materials remained unprocessed is found to be in excess of said maximum allowable quantity of materials remained unprocessed for an arbitrary production stage of a mass production line for production of a production lot.

14. A system for providing information regarding production progress in accordance with claim 13, further comprising:
   a plurality of second input means for respectively inputting a reason for causing a position in which the quantity of materials remained unprocessed is in excess of a maximum allowable quantity of materials remained unprocessed, for a production stage of a mass production line for production of a production lot, in an occasion that a sum of said received quantity of materials and said quantity of materials remained unprocessed is in excess of a maximum allowable quantity of materials remained unprocessed, for a production stage of a mass production line for production of a production lot,
   a memory means for memorizing said reason for causing said position in which the quantity of materials remained unprocessed is in excess of said maximum allowable quantity of materials,
   a plurality of computerized means for preparing a histogram representing a quantity of said position in which the quantity of materials remained unprocessed is in excess of a maximum allowable quantity of materials, and
   a plurality of fifth output means for displaying said histogram.

15. A system for providing information regarding production progress in accordance with claim 5, further comprising:
   a fourth computerized means having a first function for finding whether or not materials are remained unprocessed, whenever any of said facilities suspends operation, a second function for determining said period during which some of said facilities are remained under an idle position is caused by a lack of laborers, in the case where some quantity of materials is available for accepting a process, and said period during which some of said facilities are remained under an idle position is caused by a lack of materials, in the case where none of the materials is available for accepting a processes, and
   a fourth output means for outputting results of said fourth computerized means.

16. A system for providing information regarding production progress in accordance with claim 15, wherein said relations are expressed in a graph and said first output means is display means.

17. A system for providing information regarding production progress in accordance with claim 15, further comprising:
   a fifth computerized means for finding whether or not a sum of said received quantity of materials and said quantity of materials remained unprocessed is in excess of a maximum allowable quantity of materials remained unprocessed for a production stage of a mass production line for production of a production lot, and
   a means for informing results of said fifth computerized means, in an occasion that said sum of said received quantity of materials and said quantity of materials remained unprocessed is found to be in excess of said maximum allowable quantity of materials remained unprocessed for an arbitrary production stage of a mass production line for production of a production lot.

18. A system for providing information regarding production progress in accordance with claim 17, further comprising:
   a plurality of second input means for respectively inputting a reason for causing a position in which the quantity of materials remained unprocessed is in excess of a maximum allowable quantity of materials remained unprocessed, for a production stage of a mass production line for production of a production lot, in an occasion that a sum of said received quantity of materials and said quantity of materials remained unprocessed is in excess of a maximum allowable quantity of materials remained unprocessed, for a production stage of a mass production line for production of a production lot,
   a memory means for memorizing said reason for causing said position in which the quantity of materials remained unprocessed is in excess of said maximum allowable quantity of materials,
   a plurality of computerized means for preparing a histogram representing a quantity of said position in which the quantity of materials remained unprocessed is in excess of a maximum allowable quantity of materials, and
   a plurality of fifth output means for displaying said histogram.

19. A system for providing information regarding production progress in accordance with claim 5, further comprising:
   a fifth computerized means for finding whether or not a sum of said received quantity of materials and said quantity of materials remained unprocessed is in excess of a maximum allowable quantity of materials remained unprocessed for a production stage of a mass production line for production of a production lot, and
   a means for informing results of said fifth computerized means, in an occasion that said sum of said received quantity of materials and said quantity of materials remained unprocessed is found to be in excess of said maximum allowable quantity of materials remained unprocessed for an arbitrary production stage of a mass production line for production of a production lot.

20. A system for providing information regarding production progress in accordance with claim 19, further comprising:
   a plurality of second input means for respectively inputting a reason for causing a position in which the quantity of materials remained unprocessed is in excess of a maximum allowable quantity of materials remained unprocessed, for a production stage of a mass production line for production of a production lot, in an occasion that a sum of said received quantity of materials and said quantity of materials remained unprocessed is in excess of a maximum allowable quantity of materials remained unprocessed, for a production stage of a mass production line for production of a production lot,
   a memory means for memorizing said reason for causing said position in which the quantity of materials remained unprocessed is in excess of said maximum allowable quantity of materials,
   a plurality of computerized means for preparing a histogram representing a quantity of said position in which the quantity of materials remained unprocessed is in excess of a maximum allowable quantity of materials, and
   a plurality of fifth output means for displaying said histogram.

* * * * *